INVENTORS.
DAYMOND D. DUNCAN
BY DON E. WOOD

ATTY.

Sept. 19, 1961    D. D. DUNCAN ET AL    3,000,692
METHOD OF AND FILTER FOR PURIFYING EXHAUST
GASES OF INTERNAL COMBUSTION ENGINES
Filed Nov. 16, 1959    2 Sheets-Sheet 2

INVENTORS.
DAYMOND D. DUNCAN
BY DON E. WOOD
ATTY.

United States Patent Office 3,000,692
Patented Sept. 19, 1961

3,000,692
METHOD OF AND FILTER FOR PURIFYING EXHAUST GASES OF INTERNAL COMBUSTION ENGINES
Daymond D. Duncan and Don E. Wood, both of Box 392, Kellogg, Idaho
Filed Nov. 16, 1959, Ser. No. 853,230
3 Claims. (Cl. 23—2)

This invention relates to a novel filter for the exhaust of an internal combustion engine.

Internal combustion engines, whether portable or stationary, have an exhaust gas high in noxious gases, particularly carbon monoxide, which result in high concentration problems in modern traffic and industrial cities. This invention proposes a novel two-stage exhaust filter for removing much of the objectionable content from exhaust gases. The filter may be portable or stationary and may be built on any desired scale.

It is an object of this invention to provide an exhaust filter having no moving or mechanical parts which will efficiently remove a large percentage of carbon monoxide from exhaust gases.

It is a further object of this invention to provide an economical filter by the use of common, natural products combined in a simple operation.

The filter proposed utilizes a first stage granular mixture of bentonite, sodium chloride and vermiculite. The second stage is composed of slaked lime, sodium chloride and vermiculite, also in granular form. The result is a highly efficient and maintenance free filter made of economical materials and capable of safely removing noxious gases from exhaust gases of internal combustion engines.

The full objective of this invention will become clear from the following description and the accompanying drawings which show one preferred form of the invention. This form, disclosed specifically for purposes of illustration, is not intended to limit the scope of the invention, except as it is defined in the annexed claims.

Figure 5:
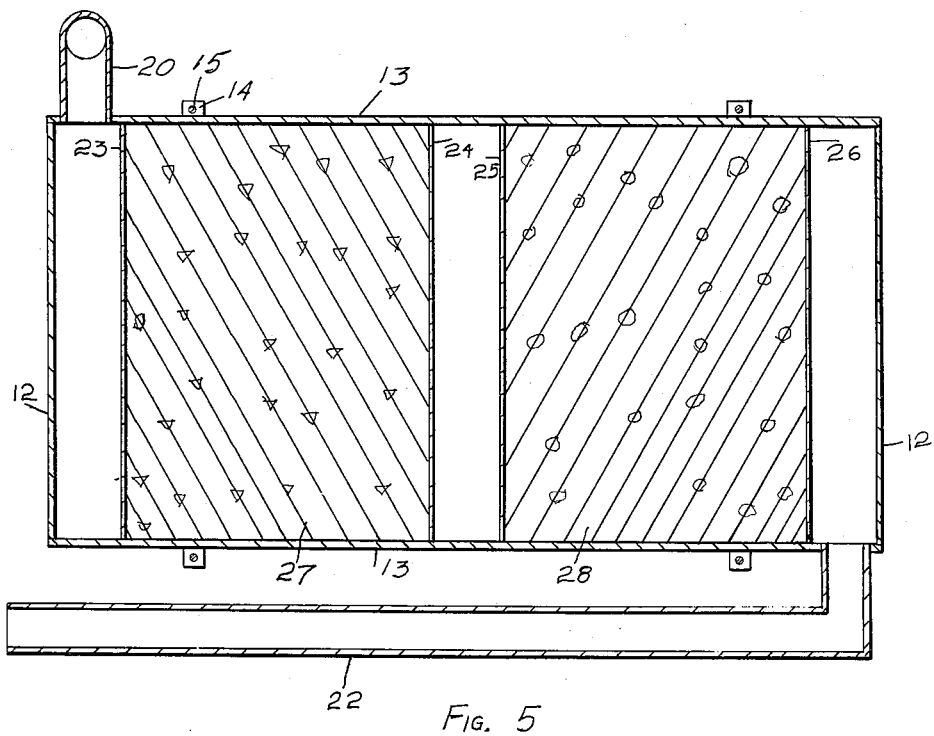
FIGURE 5 shows a sectional view taken along line 5—5 in FIGURE 4.
Figure 6:
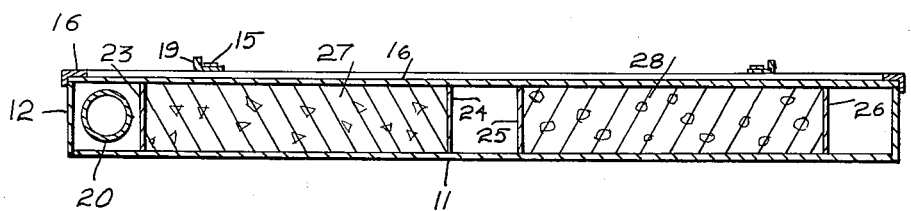
FIGURE 6 shows a sectional view taken along line 6—6 in FIGURE 1.

Referring now to the drawings, one form of the invention is shown which might be used in an automobile by mounting it within a rear tire well by a mounting bracket (not shown). It can also be used vertically on a stationary stand for industrial purposes or may be mounted on the bed of a truck. The specific mounting or form of the structure is not controlling. However, this basic structure is offered as being exemplary.

Figure 1:
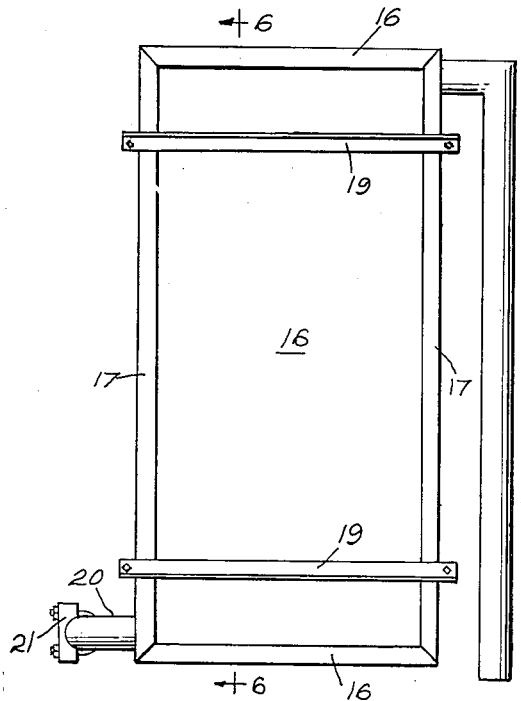
FIGURE 1 shows a front plan view of a filter structure which might be used in this invention.
Figures 3, 4:
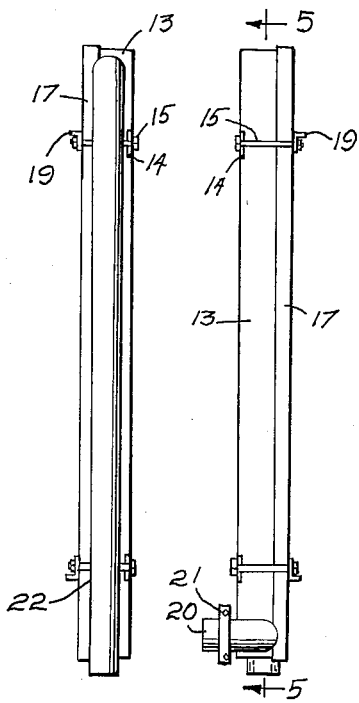
FIGURE 3 shows a right end view of the structure shown in FIGURE 1.
FIGURE 4 shows a left end view of the structure shown in FIGURE 1.
Figure 2:
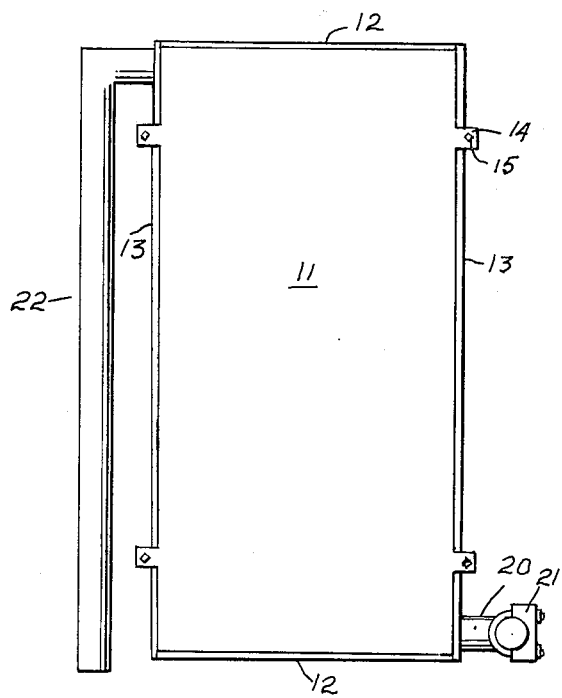
FIGURE 2 shows a back view of the structure shown in FIGURE 1.

The filter shown in its normal position in FIGURES 1-4 comprises a rectangular back 11 having welded to it a pair of vertical sides 12 and a pair of horizontal sides 13 to thereby form an open box. A pair of ears 14 extend beyond vertical sides 12 on each side of the back 11 and are formed integrally with the back 11. Each ear 14 has an aperture adapted to receive an assembly bolt 15.

The front of the structure consists of a rectangular cover formed of a rectangular sheet 16 having welded peripheral angle irons, the vertical angles being designated 17 and the horizontal angles being designated 18. A pair of cross angle irons 19 are welded perpendicular to angles 17 and have apertures in alignment with ears 14 to receive the assembly bolts 15.

A horizontal inlet connection is shown at 20 comprising a right angle piece of normal exhaust pipe and provided with a clamp 21 for attachment to a tail pipe of an automobile or the exhaust pipe of an internal combustion engine. The inlet connection is at the bottom of the assembly since warm gases in the unit will naturally flow upward. The outlet pipe 22 is connected to side 13 opposite to connection 19 and at the top of the unit. Pipe 22 has a right angle bend and extends the length of wall 13. This provides a normal circuit for the exhaust gases and deposits the final gases at their normal output position.

Welded or otherwise fastened between the back 11 and sides 13 are a plurality of screen walls 23—26. These walls provide an open area adjacent the inlet connection 20, a central open area bounded by screen walls 24, 25 and a top open area adjacent the outlet to pipe 22. The screens, when the cover is in place, form two vertical pockets which hold a first filter composition 27 and a second filter composition 28. The structure is designed to provide ready access to the inner portion for refilling and also provides an efficient two stage filtering apparatus for hot gases.

The composition 27 is a bentonite granular mixture. It is formed by mixing bentonite, sodium chloride and water and allowing the mixture to set until the bentonite has formed a highly viscous suspension. The mixture is then stirred with the addition of vermiculite. The vermiculite serves to form granules, since the mixture will be deposited on the uneven particle surfaces. This composition is then roasted to evaporate the water, leaving a highly porous granular substance. As an example of the proportions to be used, the following have proven to be satisfactory:

Bentonite _____ pounds__ 3
Sodium chloride _____ do____ 1
Water _____ quarts__ 2
Vermiculite _____ do____ 4

The composition 28 which is the second stage filter is formed identically as composition 27, with the substitution of slaked lime in the place of bentonite. The same procedure and proportions have been found to yield the desired results.

The exhaust gases are first filtered through the bentonite composition and then through the lime composition. The structure used may be of any desired form which will permit utilization of this two-stage filtering process. The two stage filter effectively removes carbon monoxide. The bentonite and slaked lime act as filters. Although the exact mechanics of this action are not fully understood, it appears that the water trapped by the bentonite and slaked lime physically absorbs the carbon monoxide content of the exhaust gases to an appreciable degree. The sodium chloride in the filtering material dissolves in the filtered water and prevents freezing of this water, so as to maintain the filter in effective operation at all temperatures. The remaining gases discharged are therefore less toxic and retain the smell which serves as a warning to persons in the vicinity.

Various modifications will present themselves to those in this field while not deviating from the scope of this invention. Therefore the following claims are presented, which are designed to define the limits of this invention.

Having thus disclosed our invention, we claim:

1. A two stage filter for internal combustion engines wherein the first stage is composed of vermiculite coated with a dried mixture of bentonite, sodium chloride and water, the second stage being composed of vermiculite coated with a dried mixture of slaked lime, sodium chloride and water.

2. A filter for exhaust gases from internal combustion engines comprising a first stage filter composition located adjacent to the filter inlet, said first stage filter composition being a granular dried mixture formed from a solution of bentonite, sodium chloride and water mixed with vermiculite, said filter further comprising a second stage filter composition located adjacent to the filter outlet, said second stage filter composition being a granular dried mixture formed from a solution of slaked lime, sodium chloride and water mixed with vermiculite.

3. A method of filtering exhaust gases from an internal combustion engine comprising first passing the exhaust gas through a layer of vermiculite coated with a dried solution of bentonite, sodium chloride and water and next passing the gas through a layer of vermiculite coated with a dried solution of slaked lime, sodium chloride and water.

References Cited in the file of this patent
UNITED STATES PATENTS

| | | |
|---|---|---|
| 1,927,102 | Sucetti et al. | Sept. 19, 1933 |
| 2,112,799 | Williams | Mar. 29, 1938 |